United States Patent [19]

Stott et al.

[11] Patent Number: 5,072,522
[45] Date of Patent: Dec. 17, 1991

[54] COUNTERBALANCE CONTROL APPARATUS

[75] Inventors: Christopher Stott, Chellaston; Howard T. Salt, Hatton, both of United Kingdom

[73] Assignee: LK Limited, Derby, United Kingdom

[21] Appl. No.: 576,512

[22] PCT Filed: Apr. 5, 1989

[86] PCT No.: PCT/GB89/00348
 § 371 Date: Nov. 13, 1990
 § 102(e) Date: Nov. 13, 1990

[87] PCT Pub. No.: WO89/09921
 PCT Pub. Date: Oct. 19, 1989

[30] Foreign Application Priority Data

Apr. 8, 1988 [GB] United Kingdom ............... 8808283

[51] Int. Cl.⁵ .............................................. G01B 5/02
[52] U.S. Cl. ...................................... 33/503; 33/1 M; 33/832

[58] Field of Search ............... 33/503, 1 M, 23.03, 33/26

[56] References Cited

U.S. PATENT DOCUMENTS

| 4,097,996 | 7/1978 | Yamazawa et al. | 33/503 X |
| 4,255,862 | 3/1981 | Nakamura | 33/503 |
| 4,924,598 | 5/1990 | Gruhler | 33/503 X |

*Primary Examiner*—Harry N. Haroian
*Attorney, Agent, or Firm*—Thomas M. Farrell

[57] ABSTRACT

A vertically-movable carriage 18 has an attached first electric motor 22 which, through rollers 24, provides a friction drive with a traction bar 16. The carriage 18 is connected by a wire rope 26 to a counterbalance weight 32. The weight (32) has an attached second electric motor 36 which, through rollers 38, provides a second friction drive with a guide bar 34. The total mass of the motor arrangement is thereby split, with one motor compensating for the other.

10 Claims, 1 Drawing Sheet

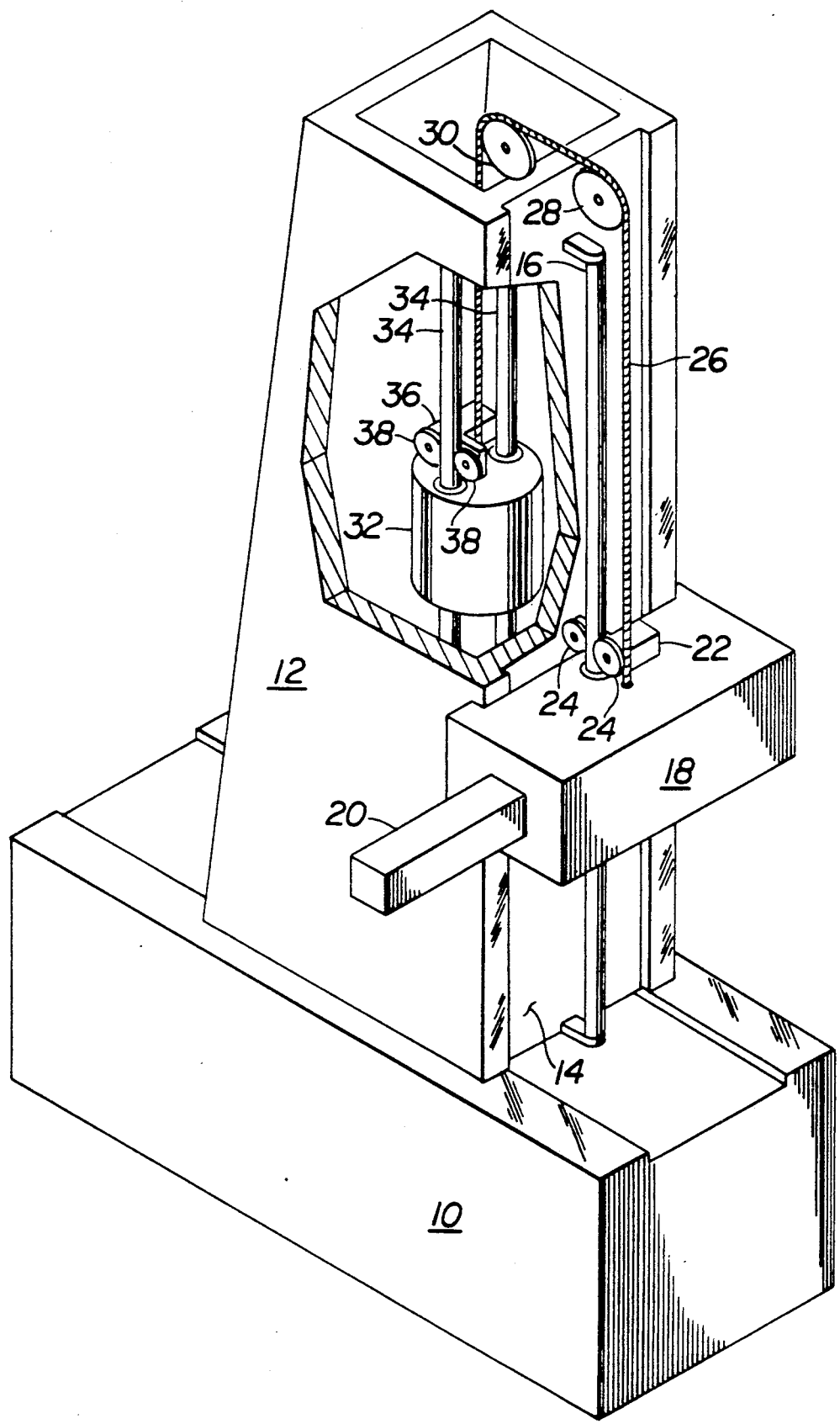

COUNTERBALANCE CONTROL APPARATUS

FIELD OF THE INVENTION

This invention relates to component control apparatus, particularly in high accuracy co-ordinate measuring machines.

BACKGROUND OF THE INVENTION

In one design, such machines conventionally can comprise a base structure providing a guideway for horizontal movement of a column which extends vertically from the base structure. The column provides a support for a vertically movable carriage which in turn locates a horizontally movable quill on which a measuring probe is mounted. Such a machine provides for three co-ordinate measurement or checking of a workpiece. The carriage movement is effected by an electric motor arrangement driving a rigidly connected carriage and counterbalance structure, the counterbalance being required to compensate for the combined weight of the carriage and the motor arrangement.

SUMMARY OF THE INVENTION

According to the present invention there is provided component control apparatus comprising a support structure for a component provided thereon, means with the component for moving the latter along a first elongate path on the structure, means interconnecting the component with counterbalance means, and means with the counterbalance means for moving the latter along a second elongate path parallel to the first elongate path in a direction opposed to that of the component, motive forces applied to each moving means being substantially equal.

Preferably each moving means is an electric motor providing a friction drive relation with respective traction means, and each electric motor may drive one of a pair of rollers, the latter having a friction drive relation with a traction bar. The electric motors are desirably identical and are connected or wired in series or series. The interconnecting means may comprise a line connected at respective ends to the component and the counterbalance means, and may be in the form of a wire rope extending across pulleys.

The invention also provides a measuring machine comprising a base structure, a further structure vertically arranged on the base structure and movable therealong, a component vertically movable on the further structure, and a component control apparatus as described in either of the two preceding paragraphs.

The component is desirably movable along a guide on an external face of the column with the counterbalance means movable within the column.

BRIEF DESCRIPTION OF THE DRAWING

The single FIGURE of the accompanying drawing is a part schematic perspective view of a measuring machine, partly cut away to show internal features.

DESCRIPTION OF THE PREFERRED EMBODIMENT

Referring to the drawing, a co-ordinate measuring machine comprises a base structure 10 providing a horizontal guideaway along which a column 12 is movable, the column 12 extending substantially vertically from the base 10. On an outer guiding face 14 of the column 12 there is provided a linear guideway, the guiding face 14 also mounting a drive or traction bar 16 for a purpose hereinafter described. A carriage 18 is provided to move vertically along the guideway, the carriage 18 carrying a horizontal quill 20 on which is mounted a measuring probe (not shown) for measurement or checking of a workpiece in a conventional manner.

An electric motor 22 mounted on the carriage 18 provides drive to one of a pair of rollers 24 which engage the bar 16 from opposed sides thereof and thereby provide a friction drive relation with the bar 16 when the motor 22 is operative.

The carriage 18 is connected to one end of a flexible line, for example in the form of a wire rope 26. The latter extends upwardly from the carriage 18 and passes over a first freely rotatable pulley 28 mounted at the guide face 14 of the column 10. The rope 26 then travels substantially horizontally and passes over a further freely rotatable pulley 30 located internally of the column 12, thereafter to extend vertically downwardly from the pulley 30 and be connected at its other end to a counterbalance deadweight 32. The latter is movable along a pair of guide bars 34 and has connected thereto an electric motor 36 also providing drive to one of a pair of rollers 38 which locate on opposed sides of one of the guide bars 34 to be in a friction drive relation therewith.

The motors 22,36 are identical and synchronise the traversing speed of the carriage 18 and the counterbalance deadweight 32. The motors 22,36 can be connected in series to thereby provide the same current to both. Alternatively the motors 22,36 can be connected in parallel. To provide both with the same voltage.

In a conventional system the total mass of the motor arrangement has to be compensated for by the counterbalance deadweight. With the present design, the total mass of the motor arrangement is split between the carriage 18 and the counterbalance deadweight 32, one motor arrangement thereby compensating for the other. The power requirement of the motor to be mounted on the carriage 18 is halved, because there are two motors sharing the total load. This permits a doubling of possible vertical axis acceleration with no increase in carriage mass, or alternatively a maintenance of the machine performance with a significant decrease in mass by the use of a smaller carriage motor. In the latter event the dynamic performance of the machine is improved as the stiffness of the structure remains as previously but with a reduced mass.

When the carriage 18 and the counterbalance deadweight 32 are driven by the respective motors in opposite directions, any difference in acceleration between the motors 22,36, for example due to inaccuracies between the drive pulleys 24 and 38 or due to differing friction forces in the bearings, will slightly change the tension within the wire rope 26. Any such change will create a greater power requirement on the motor which is accelerating at a greater speed, thus reducing the acceleration and causing the other motor to increase its acceleration, thereby sharing the power. The whole drive system thereby moves at a mean acceleration with the more efficient side helping the other. The system is accordingly self-compensating and enables just one tachogenerator signal to be monitored in order to control the total system. Fluctuations in the tensile forces within the wire rope 26 are largely eliminated, thus eliminating the need for passive damping within the counterbalance deadweight 32 and leaving virtually no vibration within the carriage 18 due to counterbalance influences, after a vertical positioning move.

Various modifications may be made without departing from the invention. For example the type of drive arrangements may be other than those described and shown and the relative positioning of components such as the free pulleys may differ from that description and shown. A chain may be utilized instead of a wire rope.

The base structure may be of the type described in our co-pending U.K. Application No. 8808282 entitled "Support Assemblies" with a temperature control as described in our co-pending U.K. Application No. 8808281 entitled "Support Structures". Further the machine components may be constructed as described in our co-pending U.K. Application No. 8808280 entitled "Machine Structure".

The invention can be utilized in other types of machine, such as a measuring machine having a movable bridge structure, a horizontally moving carriage, and a vertically moving quill with counterbalance.

We claim:

1. A control apparatus for a carriage, comprising:
   a base (10);
   a carriage (18) movably supported by said base (10) for movement in a vertical direction;
   a counterbalance member (32) movably supported by said base (10) for movement in a vertical direction;
   first motor means (22) affixed with the carriage (18) for moving the carriage (18) along a first bar (16) on the base (10);
   means (20) for interconnecting the carriage (18) with the counterbalance member (32); and
   second motor means (36) affixed with the counterbalance member (32) for moving the counterbalance member (32) along a second bar (34), in a direction opposed to that of the carriage (32), wherein respective motive forces applied to said first and second motor means (22,36) are substantially equal.

2. The control apparatus of claim 1, wherein each of said first and second motor means includes
   an electric motor, and
   a traction drive.

3. The control apparatus of claim 2, wherein each traction drive includes a drive roller.

4. The control apparatus of claim 3, wherein said electric motors are electrically wired in series.

5. The control apparatus of claim 3, wherein said electric motors are electrically wired in parallel.

6. The control apparatus of claim 3, wherein said means for interconnecting includes a flexible connector attached to the carriage and the counterbalance member.

7. The control apparatus of claim 6, further including a pulley, and wherein said flexible connector includes a wire rope trained over said pulley.

8. The control apparatus of claim 6, wherein said base includes a vertical column for supporting said carriage.

9. The control apparatus of claim 8, wherein said carriage moves exteriorly of the column, and said counterbalance member moves within the column.

10. The control apparatus of claim 2, wherein said first and second bars are vertically oriented with said base, and said first and second motor means are frictionally coupled to the respective first and second bars for respectively moving said carriage and said counterbalance member.

* * * * *